(12) United States Patent
Burnett

(10) Patent No.: US 6,423,914 B1
(45) Date of Patent: Jul. 23, 2002

(54) WHEELIE INHIBITOR DEVICE

(76) Inventor: Andrew Burnett, 56 Cloche Way, Upper Stratton, Swindon, Wiltshire SN2 6JN (GB)

( * ) Notice: Subject to any disclaimer, the term of this patent is extended or adjusted under 35 U.S.C. 154(b) by 28 days.

(21) Appl. No.: 09/748,582

(22) Filed: Dec. 22, 2000

(30) Foreign Application Priority Data

Nov. 28, 2000 (GB) .............................................. 0028923

(51) Int. Cl.[7] ................................................. H01H 3/16
(52) U.S. Cl. .................................... 200/61.44; 280/755
(58) Field of Search .......................... 200/61.44, 61.51, 200/61.52, 61.55, 61.5, 61.7, 52 A, 61.41, 61.42, 61.53; 250/755, 762, 770, 293, 304.3, 288.4, 295; 180/283, 279

(56) References Cited

U.S. PATENT DOCUMENTS

| | | | |
|---|---|---|---|
| 2,013,924 A | * 9/1935 | Nolte, Jr. ................... | 200/52 A |
| 2,613,756 A | * 10/1952 | Smith ......................... | 180/283 |
| 3,908,780 A | * 9/1975 | McClure et al. .......... | 180/82 R |
| 4,353,571 A | 10/1982 | Anderson | |
| 5,485,140 A | * 1/1996 | Bussin ........................ | 340/436 |
| 6,327,839 B1 | * 12/2001 | Velke et al. ................. | 56/14.7 |

FOREIGN PATENT DOCUMENTS

DE 19532521 A1 2/1995

* cited by examiner

Primary Examiner—P. Austin Bradley
Assistant Examiner—Lisa N Klaus
(74) Attorney, Agent, or Firm—Andrus, Sceales, Starke & Sawall

(57) ABSTRACT

A wheelie inhibitor device comprises a switch housing adapted to be secured to the rear of a vehicle and containing an electric switch 2, a switch actuating rod 8 extending from the switch housing 1 substantially behind the trailing part of the or a rear wheel of the vehicle and being adapted to touch the ground when the front end of the vehicle is tilted upwards relative to the ground by a predetermined amount, the switch 2 being electrically connected to one or more engine cut out or rear brake actuating regions of the vehicle, the arrangement being such that upon tilting upwards of the front of the vehicle by the pre-determined amount the free end of the actuating rod 8 touches the ground and thereby actuates the switch 2 to, in turn, temporarily deactivate the engine or apply the rear brake, as the case may be, to thereby inhibit the wheelie.

9 Claims, 1 Drawing Sheet

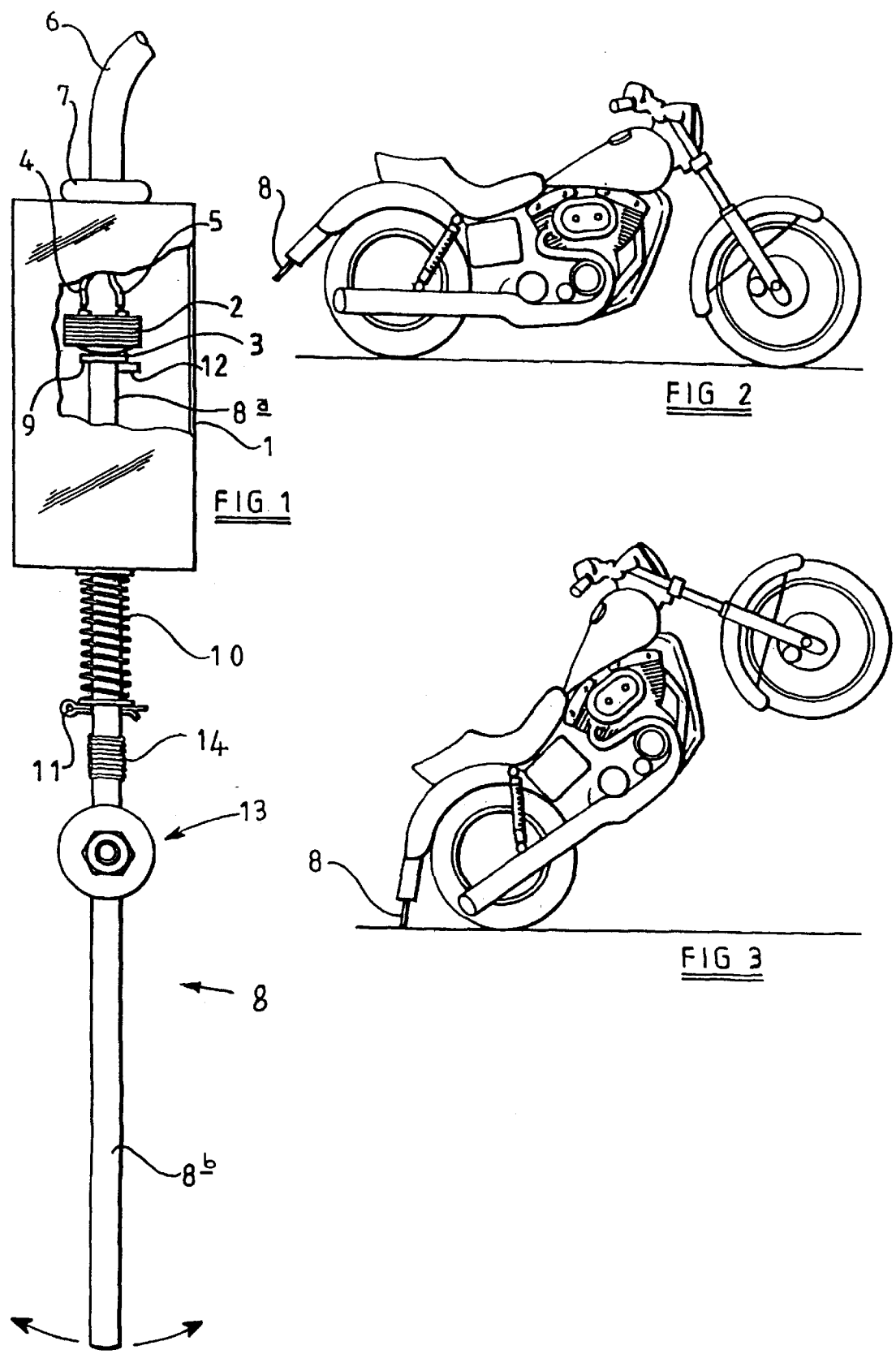

WHEELIE INHIBITOR DEVICE

This invention relates to a device for inhibiting wheelies in motorized vehicles such as motorcycles.

As is well known, a wheelie is an occurrence in which the engine of a rear wheel-driven vehicle transmits excess power to the rear wheel or wheels such that the front end of the vehicle lifts off the ground. When this happens the vehicle will tend to flip over onto its back if the excess power is not shut off completely or reduced to a level whereby the angle of the tilt of the vehicle is stabilized at a required level by appropriate adjustment of the engine throttle. Because wheelies can look spectacular to an audience they are often deliberately induced for vehicles such as racing motorcycles either during or after a race by an appropriate increase in the engine power via the throttle. However, this is at the risk of applying too much power to the rear wheel to the extent that the motor cycle flips over onto its back, with attendant consequences of damage to the motorcycle and almost certain personal injury to the rider.

Whilst wheelies are often deliberately induced by riders of motorcycles they can also happen accidentally, particularly with powerful motorcycles having a very high power to weight ratio. This can happen when a motorcycle travels over a bump in the road which can result in the rider inadvertently twisting the handlebar throttle grip by an amount sufficient to momentarily accelerate the engine to a point in which the front of the motorcycle lifts off the ground. If this happens, then unless immediate remedial action is taken by the motorcycle rider the motorcycle can again flip over onto its back with, again, the same consequences as if a wheelie had been deliberately attempted but too much power had been applied to the rear wheel.

It is an object of the present invention to provide a device for inhibiting wheelies in motorized vehicles such as motorcycles so as to prevent the vehicle from flipping over onto its back even if the wheelie is deliberately induced.

According to the invention there is provided a wheelie inhibitor device, the device comprises a switch housing adapted to be secured to the rear of a vehicle and containing an electric switch, a switch actuating rod extending from the switch housing substantially behind the trailing part of the or a rear wheel of the vehicle and being adapted to touch the ground when the front end of the vehicle is tilted upwards relative to the ground by a pre-determined amount, the switch being electrically connected to one or more engine cut out or rear brake actuating regions of the vehicle, the arrangement being such that upon tilting upwards of the front of the vehicle by the pre-determined amount the free end of the actuating rod touches the ground and thereby actuates the switch to, in turn, temporarily deactivate the engine or apply the rear brake, as the case may be, to thereby inhibit the wheelie.

Conveniently, the switch is electrically connected between the or each high tension coil and the positive or negative earth of the vehicle with the electrical circuit normally being complete and interrupted only through actuation of the actuating rod i.e. by the rod pressing against the switch to open the circuit and thereby cause an interruption in the supply of high tension current to the or each spark plug. Although this will make the engine cut out, albeit only temporarily, nevertheless other cut out regions of the vehicle may be connected to the switch, such as in the case of a motor cycle where a cutout switch is connected to the side stand to ensure that the motorcycle cannot be ridden with the side stand in its open position.

A further alternative is to connect the switch to the main ignition cut-out switch located on or adjacent to the handlebars of a motorcycle such that electrical power to the engine can be cut off either by pressing the cut-out switch or by the wheelie inhibitor device doing the same when the actuating rod pushes the switch to thereby open the circuit. This will normally be when the vehicle is tilted upwards relative to the ground until the free end of the actuating rod touches the ground and thereby causes the other end of the actuating rod to press against the electric switch and open the electrical circuit.

In an alternative embodiment, the wheelie inhibitor device is not connected to engine cut-out regions of the vehicle such as those described above but is, instead, connected to brake actuating regions and in particular to those which are capable of actuating the rear brake of the vehicle to thereby overcome the effects of the transmission of power from the engine to the or each rear wheel and as a result inhibit or prevent the occurrence of a wheelie. Conveniently, this may be achieved by a solenoid operated connection to the rear brake which is electrically activated by the actuating rod pressing against the electric switch in the switch housing to close the circuit, as opposed to opening the circuit, to thereby provide electrical current to the solenoid for the latter to then actuate the brake.

Preferably, the actuating rod is spring biased so that, whether the switch is to be normally closed or open the spring bias holds the actuating rod in the required position and axial movement of the actuating rod against the bias of the spring is required in order to open or close the switch, as required.

Preferably, the length of the actuating rod is adjustable so that the device may be fitted to any convenient rear part of a vehicle, such as the inside of a mud guard in the case of a motorcycle, and the length of the actuating rod adjusted as desired in order to determine the amount of tilt of the vehicle permitted before the free end of the actuating rod touches the ground and thereby actuates the electric switch. The actuating rod may also be adjustably articulated so that, irrespective of the angular disposition of the switch housing relative to the ground, the angle of the free end of the actuating rod may be adjusted as necessary in order to ensure that it is generally vertical to the ground when contact is made with it.

The invention will now be described, by way of example only, with reference to the accompanying drawings, in which:

FIG. 1 is a part cut-out view of a wheelie inhibitor device according to the invention, FIG. 2 is a schematic representation of a motorcycle showing the wheelie inhibitor device of FIG. 1 fitted thereon, and FIG. 3 is a view corresponding to that of FIG. 2 showing the front end of the motorcycle tilted upwards relative to the ground, corresponding to a wheelie.

Referring firstly to FIG. 1 a wheelie inhibitor device according to the invention comprises a substantially rigid housing 1 shown partly cut-out, and through which cut-out portion can be seen an electric switch 2 having a moveable switch button 3 which may be depressed inwardly relative to the switch 2 in order to disconnect electrical contact with a pair of insulated wires 4,5 leading to an engine cut-out region of a vehicle (not shown) via a conventional electric cable 6. A rubber grommet 7 prevents the ingress of dirt, water etc. into the interior of the housing 1 and also prevents chafing of the outer cover of the cable 6 in a conventional manner.

An elongated actuating rod shown generally at 8 is slideably mounted within the housing 1 and protrudes through a bore in the lower end thereof. The upper end 8a of the actuating rod 8 comprises a flange 9 which just abuts the switch button 3 but is biased against pressing against it by means of a helically wound spring 10 mounted between the outside of the lower portion of the housing 1 and a split pin 11 extending at right angles through a mid portion of the actuating rod 8. A stop member 12 is provided for the flange 9 to limit downward movement of the actuating rod 8 so that, in the position shown in the drawing, the actuating rod 8 can only move axially in one direction i.e. towards the switch 2 with the flange 9 pressing against the switch button 3 against the bias of the spring 10.

The lower portion 8b of the actuating rod 8 is articulated by means of a joint shown generally at 13 comprising a pair of washers and a threaded bolt and nut assembly so that the angular orientation of the lower portion 8b of the actuating rod relative to the remainder can be varied as required in the directions shown arrowed. To avoid or inhibit the possibility of the actuating rod 8 breaking upon contact with a hard surface such as a road the upper portion 8a of the actuating rod 8 is also jointed just above the articulated joint 13 and covered by a tightly fitting helically wound spring 14 to thereby act as a shock absorber permitting momentary flexure of the lower part of the actuating rod 8 followed by immediate return to the position or orientation set by means of the articulated joint 13 under the bias of the spring 14.

From FIG. 1 it will be apparent that where the switch 2 is of the type which is normally closed i.e. it requires the switch button 3 to be depressed in order to electrically disconnect the wires 4, 5 then, due to the bias of the spring 10 the flanged end 9 of the actuator 8 normally rests against the stop member 12 so that the wires 4,5 are normally electrically connected together. As such, it will be understood that where the free ends of these wires 4,5 are interposed between engine cut-out regions, such as between a high tension coil and the positive or negative earth of the vehicle itself, the coil can operate normally and in particular can provide high voltage current to the or each spark plug. However, if the switch button 3 is depressed by axial movement of the rod 8 against the bias of the spring 10 the circuit between the wires 4, 5 becomes open thereby deactivating the high tension coil and causing the engine to cut-out.

Turning now to FIGS. 2 and 3, these show the wheelie inhibitor device of the invention fitted to the inside rear mud-guard of a motorcycle, with FIG. 2 showing the motorcycle with front and rear wheels on the ground and FIG. 3 showing the motorcycle with the front end tilted upwards relative to the ground to the extent that the free end of the actuating rod is in contact therewith. In FIG. 2 it will be apparent that the motorcycle can be ridden in a conventional manner without interference from the wheelie inhibitor device because the free end of the actuating rod 8 does not interfere with the ground, being spaced sufficiently therefrom such that it ordinarily does not make contact with it.

In FIG. 3 it will be seen that the tilt of the front end of the motorcycle to the extent shown, corresponding to a wheelie, causes the free end of the actuating rod 8 to contact the ground, at which point axial pressure on the switch button 3 causes the circuit between the wires 4, 5 to become open, thereby causing the engine to cut-out. This immediately causes the front end of the motorcycle to drop, at which point the free end of the actuating rod 8 no longer touches the ground, the switch 2 is then closed and the motorcycle engine can then restart. This has the advantage in that if the wheelie is caused accidentally, such as by the motorcycle being ridden over a bump in the road, sufficient time is then provided for the rider to take remedial action by appropriate adjustment of the throttle. Hence, the otherwise disastrous consequences of the motorcycle turning over onto its back are avoided.

Where the wheelie is intended i.e. where the rider deliberately applies excess power to the rear wheel it will be apparent that by maintaining the level of throttle to the engine the wheelie can, in turn, be maintained at the position shown in FIG. 3 with the engine being alternately cut-off and re-started by the hunting between the switch 2 and actuating rod 8 between positions in which the free end of the latter touches the ground momentarily, causing the engine to cut-out, and positions in which the engine is re-started and excess power again applied to the rear wheel of the motorcycle. This maintains an apparently constant level of vehicle tilt but without the risk of the motorcycle flipping over onto its back.

Although the invention has been described primarily with respect to a wheelie inhibitor device which functions primarily by means of causing electrical power to the engine to be momentarily switched off, nevertheless it will be apparent to those skilled in the art that the same effect can be achieved by applying the rear brakes of the vehicle. Accordingly, in an alternative embodiment of the invention the rear brake of the vehicle can be actuated by a solenoid or similarly movable device (not shown) electrically connected to the wheelie inhibitor device in which the electrical switch 2 is of the type which is normally open such that the solenoid is only electrically activated when the flanged end 9 of the actuating rod 8 bears against the switch button 3 to thereby close the electrical connection and complete the circuit to momentarily apply the rear brake and inhibit the wheelie.

In addition to the foregoing, it will be appreciated that the wheelie inhibitor device does not necessarily need to be only electrically connected to engine cut-out regions such as between a high tension coil and the positive or negative earth of the vehicle itself but may additionally be connected to activate, for example, the lights or the horn of the vehicle to provide a visual and/or audio indication that the wheelie inhibitor device has been or is in operation as a result of the occurrence of a wheelie, whether deliberately or accidentally induced.

What is claimed is:

1. A wheelie inhibitor device comprising a switch housing adapted to be secured to the rear of a vehicle and containing an electric switch, a switch actuating rod extending from the switch housing behind a trailing part of a rear wheel of the vehicle and being adapted to touch the ground when a front end of the vehicle is tilted upwards relative to the ground by a pre-determined amount, the switch being electrically connected to a control region of the vehicle, the arrangement being such that upon tilting upwards of the front of the vehicle by the pre-determined amount a free end of the actuating rod touches the ground and thereby actuates the switch to, in turn, control the vehicle in such a manner to inhibit the wheelie.

2. A device as claimed in claim 1, wherein the switch is electrically connected in an electrical circuit between at least one high tension coil and a positive or negative earth of the vehicle with the electrical circuit normally being complete and interrupted only through actuation of the actuating rod.

3. A device as claimed in claim 1, wherein the switch is electrically connected in a circuit including a cut-out switch associated with a side stand of the vehicle.

4. A device as claimed in claim 1, wherein the switch is electrically connected in a circuit including a main ignition cut-out switch of the vehicle.

5. A device as claimed in claim 1, wherein the switch is connected to a circuit used in controlling the operation of a rear brake of the vehicle.

6. A device as claimed in claim 5, further including a solenoid operated connection to the rear brake which is electrically activated by the actuating rod pressing against the electric switch in the switch housing to close the circuit, as opposed to opening the circuit, to thereby provide electrical current to the solenoid for the latter to then actuate the brake.

7. A device as claimed in claim 1, wherein the actuating rod is spring biased so that, whether the switch is to be normally closed or open the spring bias holds the actuating rod in the required position and axial movement of the actuating rod against the bias of the spring is required in order to open or close the switch, as required.

8. A device as claimed in claim 1, wherein the length of the actuating rod is adjustable.

9. A device as claimed in claim 1, wherein the actuating rod is articulated.

* * * * *